Patented Jan. 2, 1923.

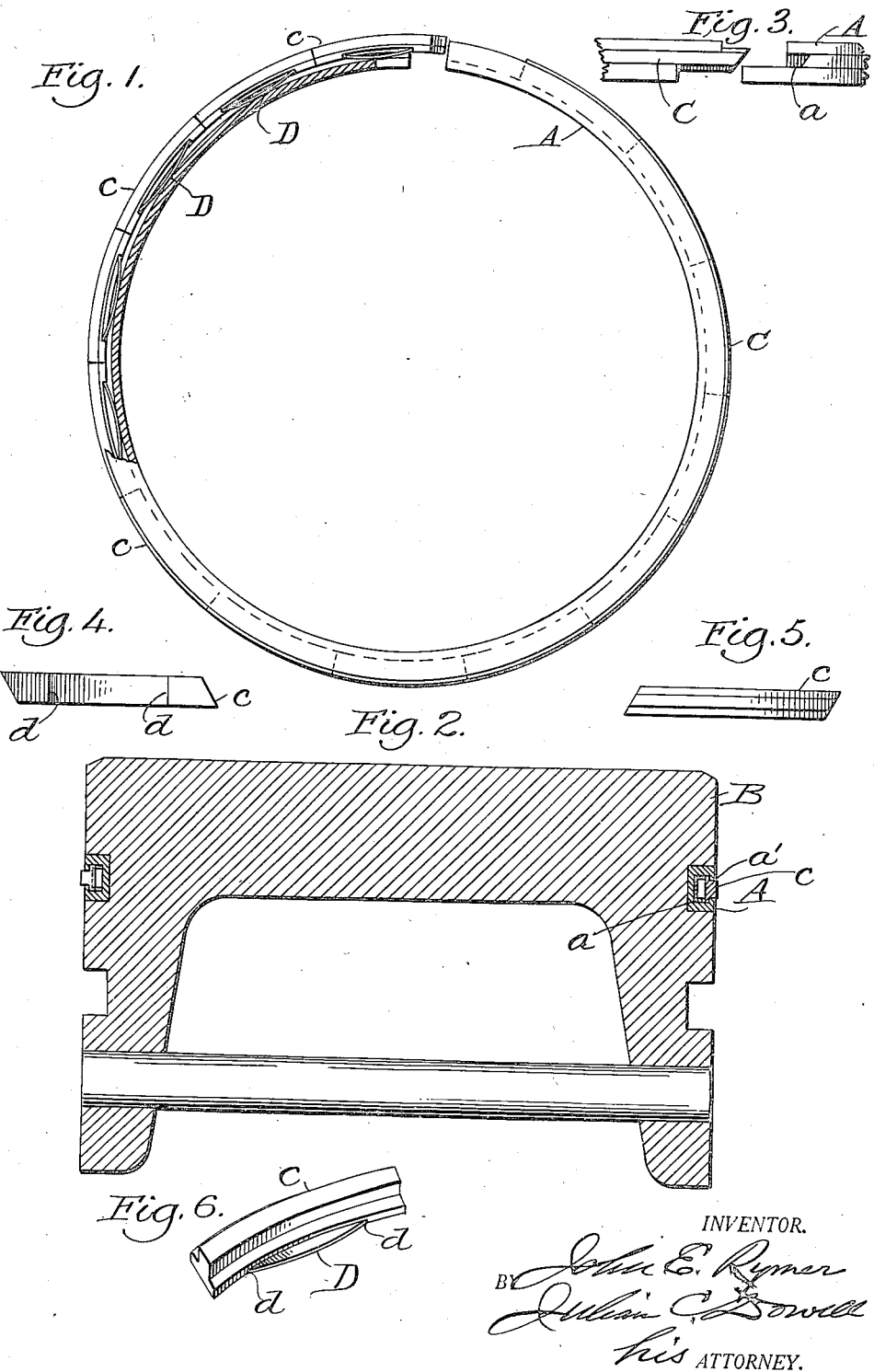

1,440,895

UNITED STATES PATENT OFFICE.

JOHN EDWIN RYMER, OF HYATTSVILLE, MARYLAND.

PISTON PACKING RING.

Application filed March 31, 1922. Serial No. 548,350.

*To all whom it may concern:*

Be it known that I, JOHN E. RYMER, a citizen of the United States, residing at Hyattsville, in the county of Prince Georges and State of Maryland, have invented certain new and useful Improvements in Piston Packing Rings; and I do hereby declare the following to be a full, clear, and exact description of the invention, such as will enable others skilled in the art to which it appertains to make and use the same.

This invention relates to piston packing rings, and has for its object to provide a piston ring that will stop leaks due to worn or pitted cylinders, and thereby eliminate oil pumping and reduce carbon deposits to a minimum.

Owing to the fact that all cylinders and pistons of gas engines wear unevenly, due to the tendency of the piston head to slap against the cylinder walls on the sides thereof parallel to the crank shaft, it is obvious that a solid ring running all the way around a worn cylinder cannot touch at all points at the same time, and new cylinders which have been ground perfectly round may wear out of round when heated in service, and so also a piston ring reaching all the way around the cylinder may not touch the walls at all points when heated.

The invention consists of an improved packing ring comprising a channeled split ring having a multi-piece ring fitted in the channel therein and adapted to "seat" or touch the walls of the cylinder at all points at all times, regardless of the fact that the cylinder may become worn out of round or pitted.

The invention will first be hereinafter more particularly described, with reference to the accompanying drawings, which are to be taken as a part of this specification, and then pointed out in the claims at the end of the description.

In said drawings, Fig. 1 is a side elevation, partly in section, of a resilient piston packing ring embodying my invention;

Fig. 2 is a transverse section of a piston having my improved packing ring applied thereto;

Fig. 3 is a detail fragmentary plan view of the meeting ends of said packing ring showing the same in separated relation, as they appear when removed from the piston and not under compression;

Figs. 4, 5 and 6 represent, respectively, a detail inverted or bottom plan view, a top plan view, and a perspective view, of one of the segments of a sectional packing ring detached.

Referring to said drawings, in which the same reference characters are used to denote corresponding parts in different views, the letter A denotes a piston packing ring, which is adapted to be slipped on a piston B and snapped into an annular recess in the periphery thereof, as shown in Fig. 2 of the drawings. Said packing ring comprises a main body portion, which is longitudinally channeled or recessed as at $a$, to receive a multi-piece packing ring C; said channel or recess being preferably rectangular or square in cross-section and having a longitudinal slot $a^1$ on the outer side thereof opening into said channel or recess. The ring C is composed of a series of parts or segments $c, c$, having beveled ends and substantially T-shaped in cross-section to adapt them to fit snugly within said correspondingly shaped channel or recess $a$, so as to permit a limited radial movement of the segments under pressure of an underlying spring D. The springs D are arranged underneath the segments between oppositely disposed shoulders or abutments $d$ with which the ends of the springs may contact, but preferably the distance between said abutments is slightly greater than the length of the spring, so that the ends of the spring do not normally contact with said abutments, which would give a very stubborn resistance against the cylinder walls and might interfere with the seating of the resilient ring, as the desired spring effect will result from the semi-elliptical shape of the flat metal spring resting with its two ends against the segment, between said shoulders or abutments, and with its top center resting on the bottom of the channel in the resilient ring, thus securing the springs on the undersides of the segments in such manner that the segments are free to be depressed beneath the face of the solid ring but are caused to remain above the face thereof by pressure of the underlying springs. The shoulders $d$ may be formed by cutting away the inner or underside of the segment, as shown in Figs. 1 and 6. The segments may be of any desired length and size suitable for the purpose stated, and the number used will vary according to the size of the piston ring and the piston in which it is to be used. Ordinarily, for pistons of the Ford machine type, fourteen segments are used, but a greater or less number may be employed, a given number of segments being of the same length as the channeled ring. The springs underlying the segments should not of course have sufficient strength to prevent the solid channeled ring from coming into contact with the cylinder wall at any point, but merely strength enough to adapt the segments to be forced against the wall of the cylinder at a point or points where the solid ring may not touch. In assembling, the springs, which are slightly bowed, are placed underneath the segments with their ends bearing upon the inner side of the segment between opposite disposed abutments, and the segments together with the springs are then inserted in the channel at one end of the solid resilient ring.

The channeled resilient ring is preferably constructed of annealed iron, while the segments forming the sectional ring are preferably constructed of steel, though any suitable metal may be used. Instead of a single series of segments forming the sectional ring, it may consist of a plurality of sectional rings composed of segments arranged side by side within the channel of the solid ring, so as to break joints between the end portions of adjacent segments, in which case a single flat or leaf spring, or a plurality of leaf springs, may be secured on the underside of each pair of segments, in the manner hereinbefore described, so that the outer surfaces of the segments may be held in yielding contact with the outer wall of the cylinder in which the piston works.

Having thus described my invention, what I claim as new and desire to secure by Letters-Patent is:

1. A piston packing ring comprising a solid, resilient split ring longitudinally recessed or channeled, together with a sectional ring composed of short segments inserted in the channel of said solid ring and protruding through a longitudinal slot in said solid ring opening into said recess, each of said segments having a spring bearing on the underside thereof, whereby it is yieldingly held in contact with the cylinder wall.

2. A piston packing ring comprising a solid, resilient split ring having a longitudinal recess or channel therein of substantially rectangular form in cross-section and a longitudinal slot opening into said channel, and a multi-piece packing ring composed of short segments having beveled ends fitted within said channel end to end and protruding through said slot, each segment having a base flange underlying the edge of the metal along said slot to prevent its escape therefrom and having a leaf spring bearing on its underside whereby it is held in yielding contact with the inner wall of a cylinder.

3. A multi-piece piston packing ring comprising a solid, resilient ring having a channel therein of approximately T-shaped form in cross-section, and a sectional ring composed of a series of segments of approximately T-shaped form in cross-section fitted in said channel, each of said segments having a leaf spring bearing on the underside thereof and oppositely disposed abutments adapted to engage the ends of the spring.

In testimony whereof I affix my signature in the presence of two witnesses.

JOHN EDWIN RYMER.

Witnesses:
 FRED A. COLDWELL,
 J. W. BILLMEYER.